United States Patent
Mistry et al.

(10) Patent No.: US 11,513,215 B2
(45) Date of Patent: Nov. 29, 2022

(54) SONAR WITH ENHANCED NON-TARGET SCATTER SUPPRESSION

(71) Applicant: BAE SYSTEMS plc, London (GB)

(72) Inventors: Nikhil Mistry, Southampton (GB); Timothy Grant Leighton, Southampton (GB); Paul Robert White, Southampton (GB)

(73) Assignee: BAE Systems plc, London (GB)

( * ) Notice: Subject to any disclaimer, the term of this patent is extended or adjusted under 35 U.S.C. 154(b) by 6 days.

(21) Appl. No.: 16/759,458

(22) PCT Filed: Oct. 30, 2018

(86) PCT No.: PCT/GB2018/053128
§ 371 (c)(1),
(2) Date: Apr. 27, 2020

(87) PCT Pub. No.: WO2019/086850
PCT Pub. Date: May 9, 2019

(65) Prior Publication Data
US 2020/0292698 A1  Sep. 17, 2020

(30) Foreign Application Priority Data

Oct. 31, 2017 (EP) .................................... 17199457
Oct. 31, 2017 (GB) .................................... 1717987

(51) Int. Cl.
*G01S 15/10* (2006.01)
*G01S 7/524* (2006.01)
*G01S 7/527* (2006.01)
*G01S 7/539* (2006.01)

(52) U.S. Cl.
CPC ............ *G01S 15/104* (2013.01); *G01S 7/524* (2013.01); *G01S 7/527* (2013.01); *G01S 7/539* (2013.01)

(58) Field of Classification Search
None
See application file for complete search history.

(56) References Cited

U.S. PATENT DOCUMENTS

| | | | | |
|---|---|---|---|---|
| 3,969,725 A | * | 7/1976 | Couvillon | G01S 13/282 |
| | | | | 342/47 |
| 4,491,930 A | * | 1/1985 | Hyatt | G01S 15/8977 |
| | | | | 708/3 |
| 5,659,320 A | | 8/1997 | Pouit | |

(Continued)

FOREIGN PATENT DOCUMENTS

| | | |
|---|---|---|
| EP | 1227341 A2 | 7/2002 |
| EP | 1739455 A2 | 1/2007 |

(Continued)

OTHER PUBLICATIONS

International Search Report and Written Opinion received for PCT Application No. PCT/GB2018/053128, dated Jan. 3, 2019. 15 pages.
Extended European Search Report received for EP Application No. 17199457.7, dated Apr. 17, 2018. 8 pages.
GB Search Report under Section 17(5) received for GB Application No. 1717987.0, dated Mar. 6, 2018. 3 pages.

(Continued)

Primary Examiner — Isam A Alsomiri
Assistant Examiner — Vikas Atmakuri
(74) Attorney, Agent, or Firm — Finch & Maloney PLLC

(57) ABSTRACT

Disclosed is a SONAR system operable to transmit a pair of pulses including an up-chirp signal and a down-chirp signal wherein the down-chirp signal is a time-reversed version of the up-chirp signal. Also disclosed is a related method of operation.

20 Claims, 8 Drawing Sheets

(56) References Cited

U.S. PATENT DOCUMENTS

| | | | | |
|---|---|---|---|---|
| 6,211,815 | B1* | 4/2001 | Richey | H02M 3/285 |
| | | | | 342/194 |
| 6,573,982 | B1* | 6/2003 | Pruitt | G01S 17/26 |
| | | | | 356/5.01 |
| 2003/0022651 | A1* | 1/2003 | Bannasch | H04L 1/04 |
| | | | | 455/307 |
| 2005/0007882 | A1* | 1/2005 | Bachelor | G01S 15/89 |
| | | | | 367/103 |
| 2008/0100823 | A1* | 5/2008 | Delfyett | G01S 7/4812 |
| | | | | 356/5.01 |
| 2010/0164806 | A1* | 7/2010 | Pillai | G01S 7/28 |
| | | | | 342/385 |
| 2012/0230371 | A1* | 9/2012 | Chiskis | G01S 13/284 |
| | | | | 375/143 |
| 2016/0103204 | A1* | 4/2016 | Valentine | G01S 7/022 |
| | | | | 342/20 |
| 2016/0371555 | A1* | 12/2016 | Derakhshani | G06K 9/00228 |
| 2017/0016983 | A1 | 1/2017 | Hoshuyama | |
| 2017/0146642 | A1* | 5/2017 | Stokes | G01S 7/6218 |
| 2017/0285135 | A1* | 10/2017 | Valentine | G01S 7/285 |
| 2019/0086531 | A1* | 3/2019 | Rick | G01S 7/536 |

FOREIGN PATENT DOCUMENTS

| | | |
|---|---|---|
| GB | 2466822 A | 7/2019 |
| WO | 2015092418 A2 | 6/2015 |
| WO | 2019086850 A1 | 5/2019 |

OTHER PUBLICATIONS

Gutowski, et al., "Chirp sub-bottom profiler source signature design and field testing," Marine Geophysical Researches, vol. 23: pp. 481-492. 2002.

Leighton, et al., "Clutter suppression and classification using twin inverted pulse sonar (TWIPS)," Proc. R. Soc. A, vol. 466: pp. 3453-3478. Jun. 2, 2010.

Rasool, S.B., and Bell, M. R., "Biologically Inspired Processing of Radar Waveforms for Enhanced Delay-Doppler Resolution," IEEE Transactions on Signal Processing, vol. 59, No. 6, pp. 2698-2709. Jun. 2011.

International Preliminary Report on Patentability received for PCT Application No. PCT/GB2018/053128, dated May 14, 2020. Updated May 15, 2020. 8 pages.

* cited by examiner

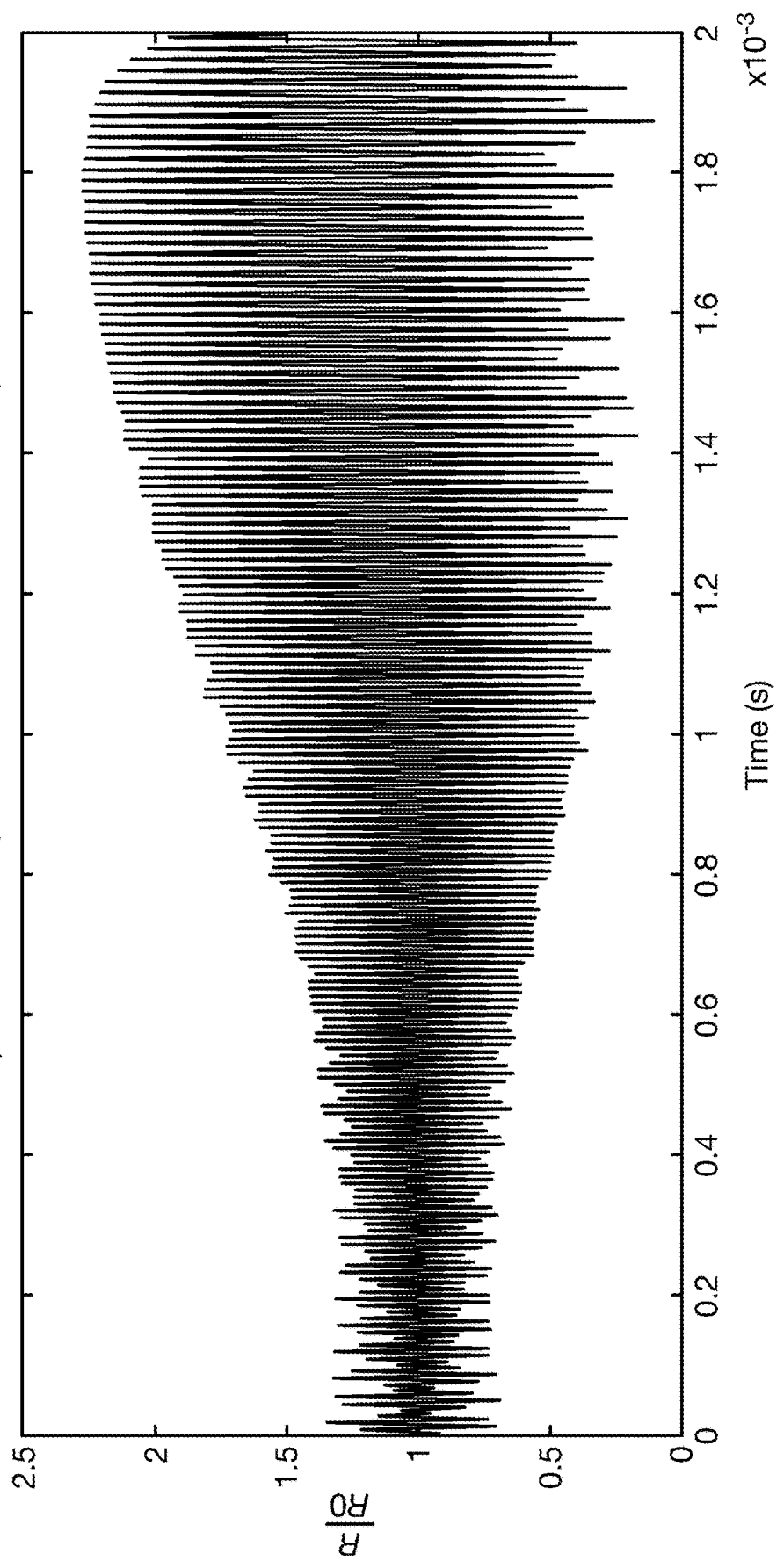

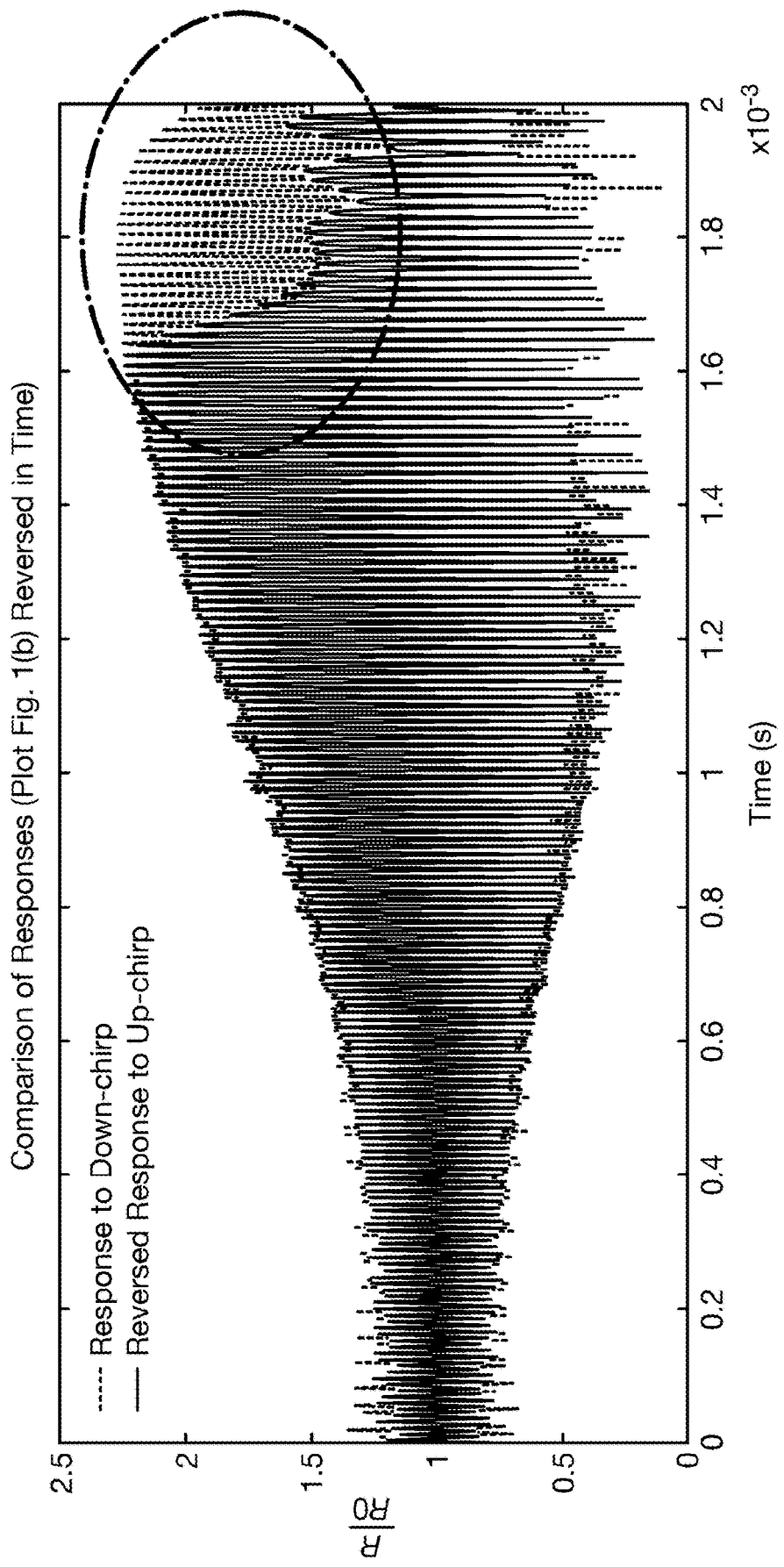

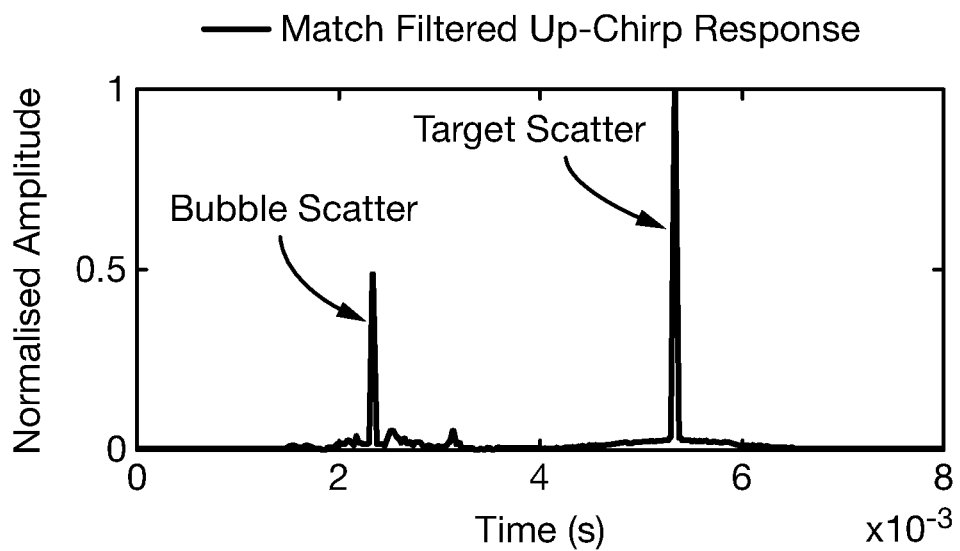
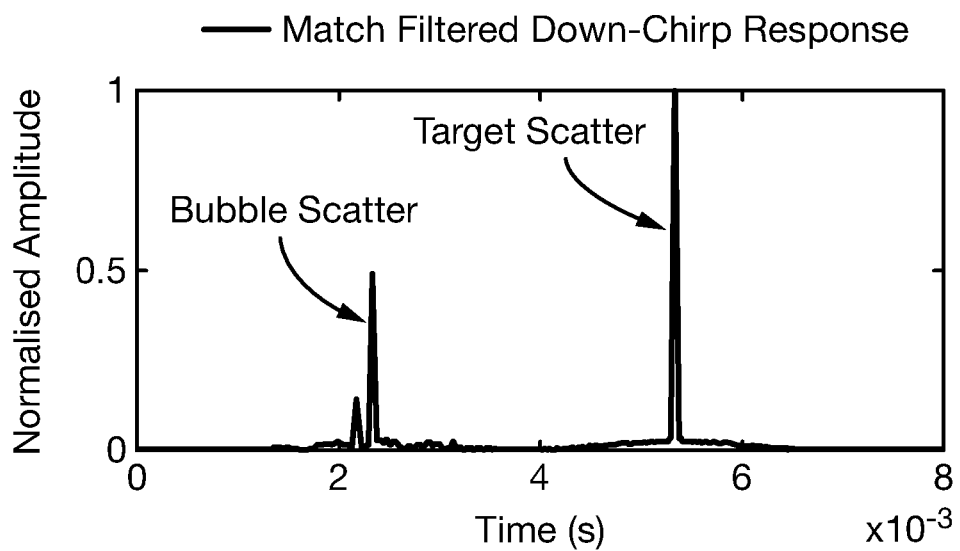

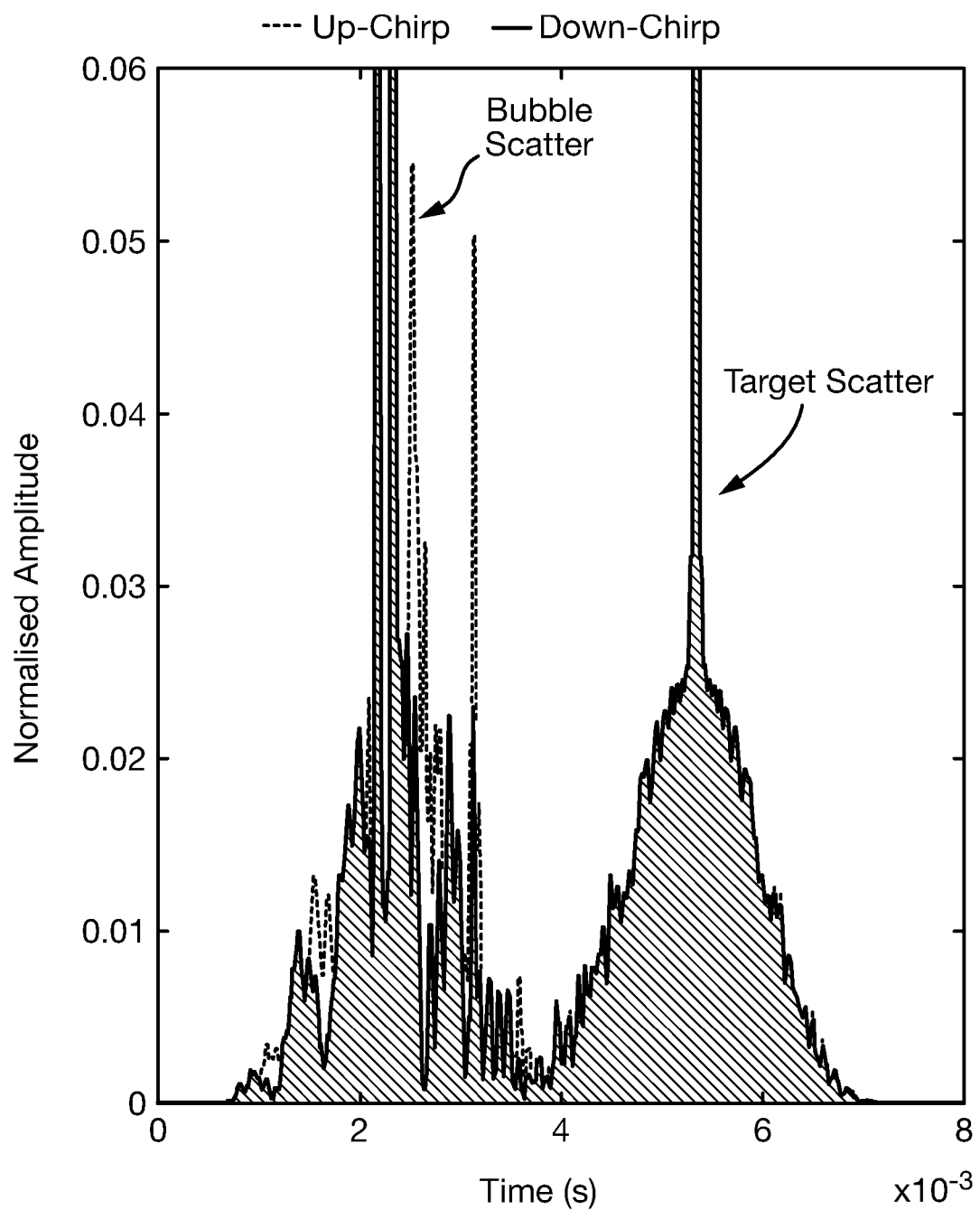

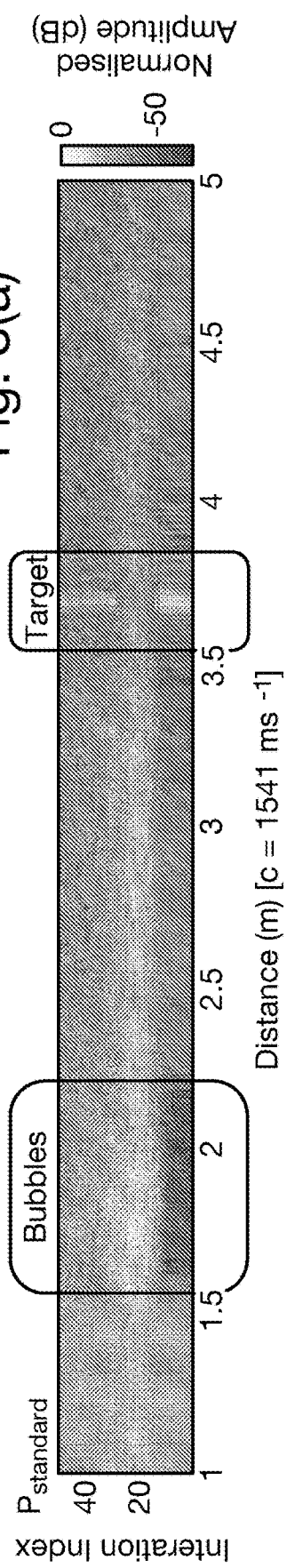
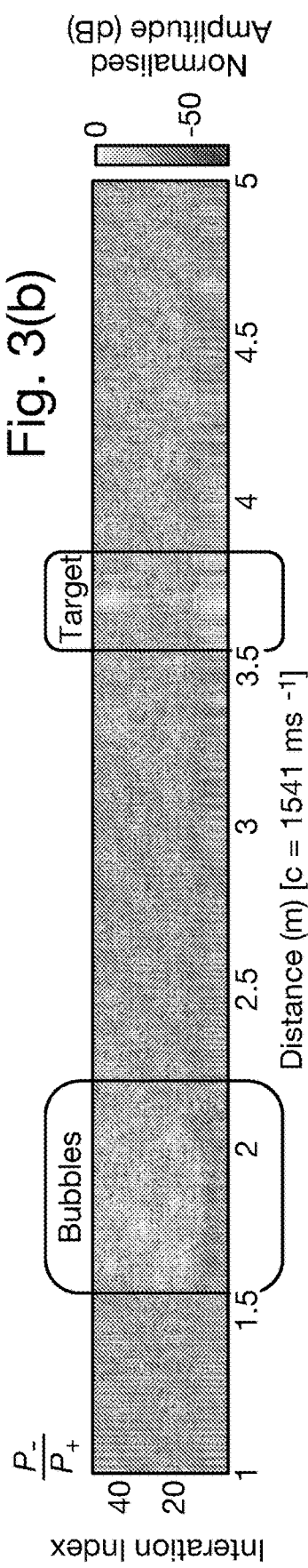
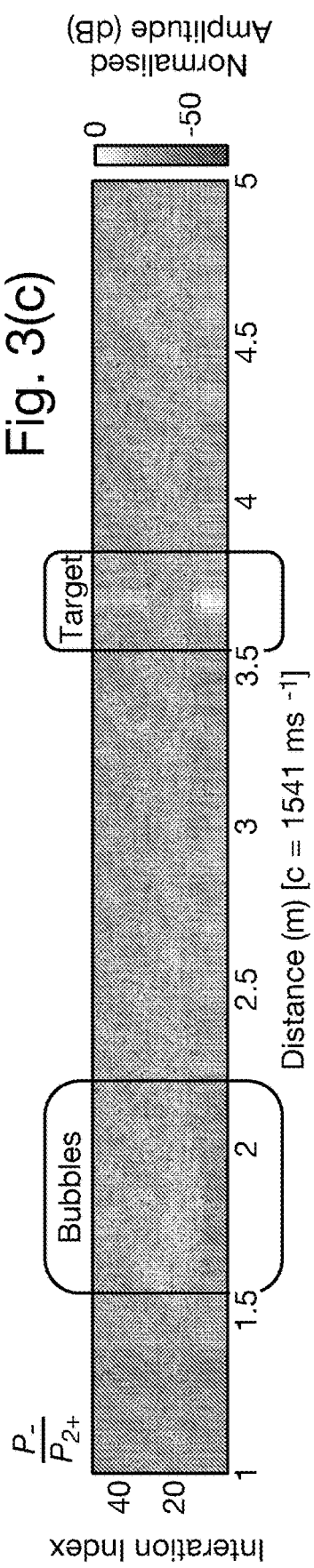

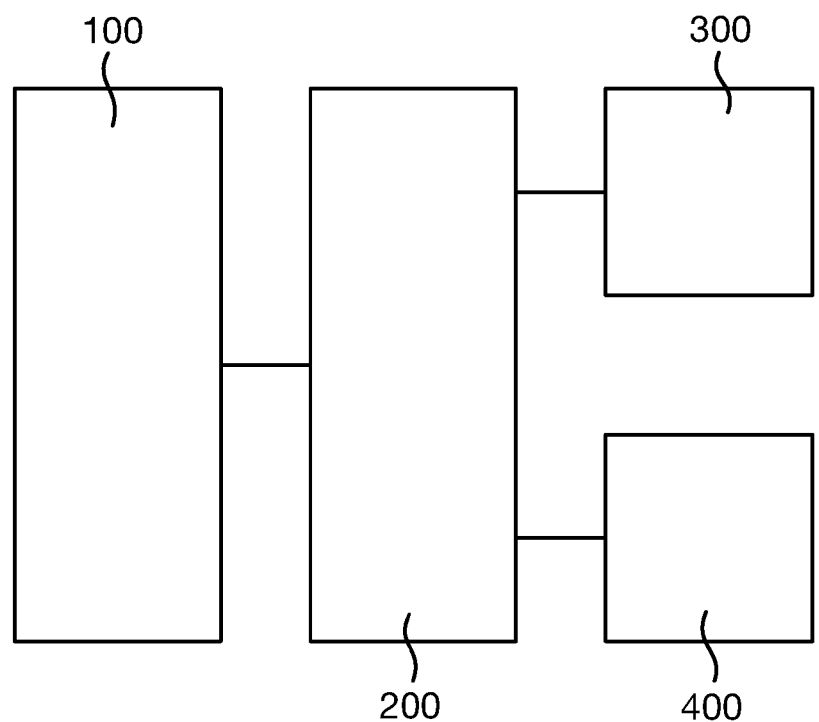

SONAR WITH ENHANCED NON-TARGET SCATTER SUPPRESSION

The present invention relates to SONAR systems and particularly SONAR systems operable in a fluid medium comprising gas bubbles. Usually, the environment of interest is an open body of water such as the ocean.

SONAR systems often have difficulty in bubbly conditions, which can be brought about by interaction with physical features of the coastline or seabed as well as by ships and boats. The measurement and modelling of surface ship bubbly wakes is of great importance in military applications. The wake may interfere with acoustic operations through scattering and absorption while also providing a method for detection, tracking and identifying a particular ship.

When SONAR is used to identify a target (which may be a target in the military sense or, more generally, an object of interest), problems may be encountered with the acoustic backscatter from bubbles. When insonified (i.e. subjected to acoustic energy from a SONAR transmitter), the backscatter from bubbles can hinder the detection of 'real' targets in the water. Furthermore, when excited by a high amplitude acoustic pressure, the bubbles demonstrate their inherently nonlinear behaviour if they are of the correct size, which usually means they are close to their pulsation resonance or, if the amplitude is sufficiently high (i.e. sufficient to enable the water to briefly go into tension during the peak rarefaction of the acoustic cycle), smaller than their pulsation resonance.

There are known prior art techniques which use a number of two-pulse sonar techniques which can be employed to separate linear and nonlinear scatterers. TWin Inverted Pulse Sonar (TWIPS) and Biased Pulse Summation Sonar (BiaPSS) are known processes that exploit nonlinear bubble dynamics to perform such a classification, with clutter reduction. Consequently, these techniques can be used to enhance target detection in bubbly waters. TWIPS and BiaPSS rely upon bubbles being driven to large nonlinear pulsations, but this is dependent upon availability of a high-amplitude SONAR source.

It is an aim of embodiments of the present invention to address issues with the prior art techniques, whether mentioned explicitly herein or not.

According to the present invention there is provided an apparatus and method as set forth in the appended claims. Other features of the invention will be apparent from the dependent claims, and the description which follows.

According to a first aspect of the invention, there is provided a SONAR system operable to transmit a pair of pulses including an up-chirp signal and a down-chirp signal wherein the down-chirp signal is a time-reversed version of the up-chirp signal. The up-chirp signal is an FM signal with a rising frequency and the down-chirp signal is an FM signal with a falling frequency.

Suitably, the up-chirp signal and the down-chirp signal at least partially overlap.

Suitably, the up-chirp signal and down chirp signal are transmitted simultaneously.

Suitably, the frequency of the up-chirp and down-chirp signals changes in a linear fashion over a fixed time period.

Suitably, the frequency of the up-chirp and down-chirp signals changes in a logarithmic fashion over a fixed time period.

Suitably, the system further comprises a receiver having a pair of matched filters, each of the pair of matched filters having a transfer function or impulse response which is a time-reversed replica of the respective transmitted up-chirp or down-chirp.

According to a first aspect of the invention, there is provided a method of operating a SONAR system comprising the steps of transmitting an up-chirp signal and a down-chirp signal wherein the down-chirp signal is a time-reversed version of the up-chirp signal.

Suitably, the up-chirp signal and the down-chirp signal at least partially overlap.

Suitably, the up-chirp signal and down-chirp signal are transmitted simultaneously.

Suitably, the frequency of the up-chirp and down-chirp signals changes in a linear fashion over a fixed time period.

Suitably, the frequency of the up-chirp and down-chirp signals changes in a logarithmic fashion over a fixed time period.

For a better understanding of the invention, and to show how embodiments of the same may be carried into effect, reference will now be made, by way of example, to the accompanying diagrammatic drawings in which:

FIGS. 1a-c show bubble response to up and down chirps;

FIGS. 2a-c show match-filtered responses of a cloud of bubbles to an up-chirp superimposed on a down chirp;

FIGS. 3a-c show different processing applied to an up chirp and down chirp transmitted simultaneously;

FIG. 5 shows a hardware implementation suitable for use with embodiments of the invention.

As discussed with reference to the prior art, the use of a pair of time-reversed chirp signals has been proposed previously for biomedical applications. However, according to an embodiment of the present invention, it is possible to enhance the scatter from both linear targets and bubbles, with a greater effect on the former, owing to the difference between bubble responses, to an increasing or decreasing frequency sweep of the driving chirp signal.

When a bubble is insonified at a frequency that is much greater than its resonance, it barely responds. It does not pulsate to large amplitudes because it is being driven off-resonance in the inertia-controlled regime. However, when a bubble is driven off-resonance but at a frequency that is less than its resonance, it can still pulsate. This is because a small bubble responds with a fast response time.

Considering a pair of down-chirp pulses (i.e. the chirp signal is reduced from a higher to a lower frequency), prior to being driven at resonance each bubble has been insonified by frequencies higher than its resonance, to which it barely responds, as stated before. Therefore, the initial condition is similar to a stationary bubble wall. Subsequently, the lower frequencies in the down-chirp can delay the damped decay of its resonant oscillations. Therefore, two down-chirps give reproducible echoes from the bubbles, with greater amplitudes in nonlinear response.

In contrast, a pair of up-chirp pulses (i.e. the chirp signal is increased from a lower to a higher frequency) will both drive the bubble into oscillation before its resonance and, as such, the initial conditions are not so reproducible (and therefore the cancellation and enhancement provided by the prior art TWIPS technique is not so effective). In addition, the damped decay is more rapid and reduces the energy of the nonlinear signal components.

Figure 1B:
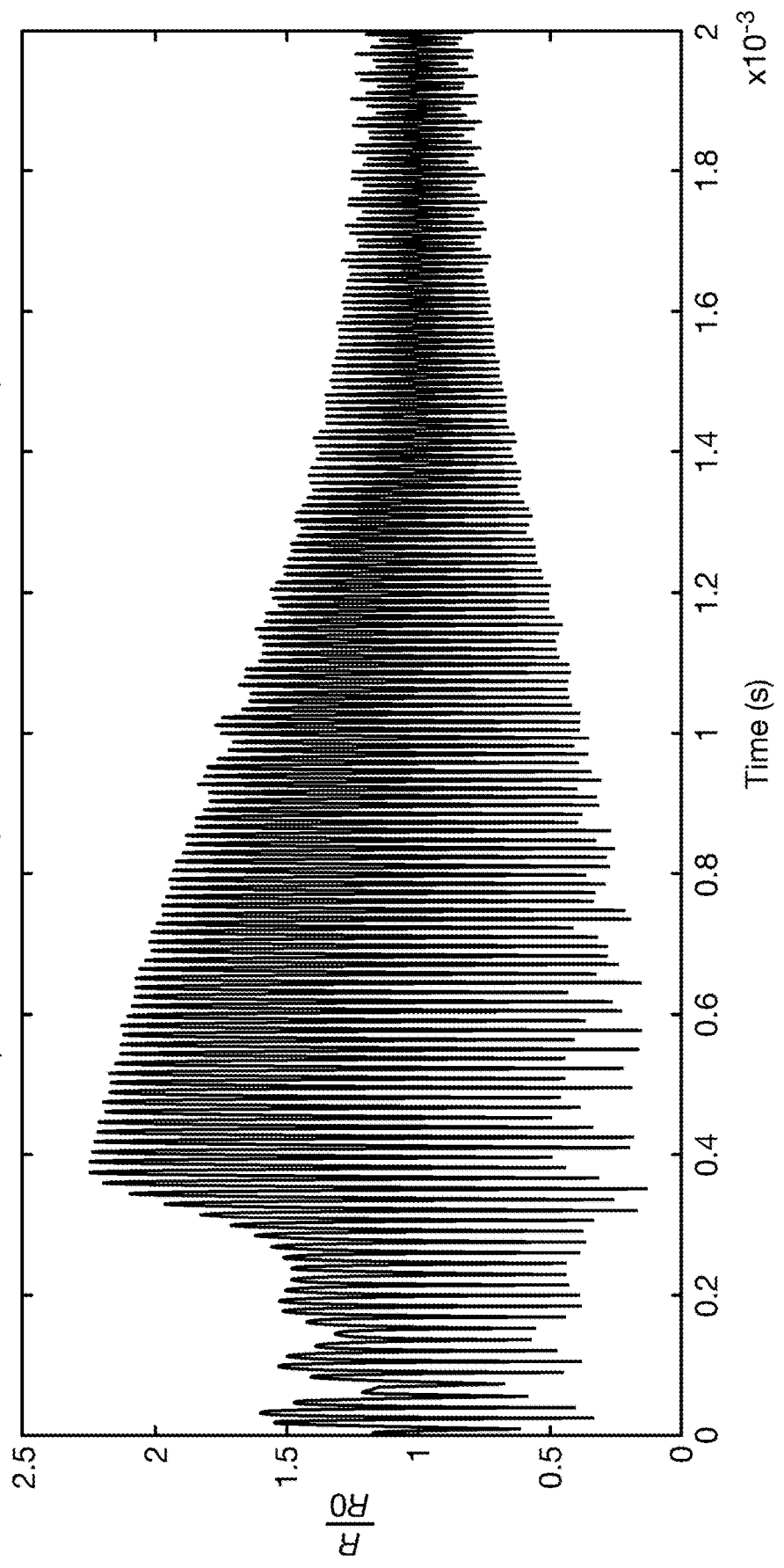

This is illustrated in FIG. 1, which shows the response of a 35 μm bubble when insonified by both a linearly decreasing—as shown at (a)—and increasing—as shown in (b)—sine sweep. It is immediately obvious that the responses are different, confirming this by reversing the response to the up-chirp and overlaying it on top of the response to the down-chirp—as shown at (c). The circled region at the right of the plot clearly shows the different bubble responses to the up and down chirp signals.

Analysis of the responses during the time for which the driving signal is below the bubble's natural frequency indicates that the down-chirp yields a greater nonlinear response.

For a linear scatterer, the responses will be the same. Therefore a subtraction of the two will cancel each other, whereas P+ (the sum of the echoes from the two pulses) will be non-zero. However, using time-reversed pulses that are also in anti-phase, the subtraction of the two reflections should enhance the linear component while suppressing the even-numbered harmonics too. The addition of the two will only contain the odd-numbered harmonics thus providing a similar effect to the prior art TWIPS technique with identical, anti-phase pulses.

In the prior art TWIPS technique, there is a necessity for both pulses to have a sufficient delay between them to allow echoes from the first pulse to end before the second pulse is emitted. However, the delay also needs to be short enough to ensure that the same bubble cloud is insonified by both pulses.

Embodiments of the present invention address this issue and allow for a greater range of detection (ignoring transmission loss and attenuation owing to bubbles and other particulates) by emitting two pulses in close proximity or at once. Simultaneously emitting identical pulses in anti-phase (as used in TWIPS) would result in emitting nothing as the two pulses would cancel each other out. Therefore, embodiments of the invention use two different pulses that give similar (match-filtered) responses by a bubble cloud.

In order to ensure that the transmitted pulses do not simply cancel each other, the profiles of the up and down chirp signals are selected such that this does not happen. Furthermore, the degree of simultaneity required can be selected to ensure the desired result. Prior art systems, such as TWIPS, require a distinct separation between the transmitted pulses. In embodiments of the present invention, a degree of overlap is possible and preferred. The degree of overlap can range from no overlap up to complete overlap where the transmit time of one pulse is the same as or comprised within the transmit time of the other pulse.

By using a time-reversed pulse pair, it becomes possible to emit the up and down-chirp simultaneously and subsequently suppress reflections from either chirp by using appropriate matched filters. By employing this method, the effect of inter-pulse delay on detection range no longer becomes relevant. Furthermore, simultaneously emitting both pulses allows for the same bubble population to be insonified by both the up and down chirp simultaneously.

This differs from the technique used in the prior art TWIPS technique, which uses a pair of pulses which are in anti-phase and which, if transmitted simultaneously would simply cancel each other out.

In a first embodiment of the invention, the frequency change in the chirp (both up and down variants, since they are time-reversed versions of each other) is linear i.e. the chirp contains a sweep from frequency A to frequency B, in a linear fashion, over a fixed time period. The rate of change of frequency is ([frequency B−frequency A]/time period).

In a second embodiment of the invention, the frequency change in the chirp (both up and down variants, since they are time-reversed versions of each other) is logarithmic i.e. the chirp contains a sweep from frequency A to frequency B, in a logarithmic fashion, over a fixed time period. An advantage of this arrangement, compared to the linear embodiment, is an immunity to Doppler effects, which is advantageous in practical situations.

It is the filtering process, on receipt of echoes from the pair of pulses, that separates the echoes into the responses to one particular component of the pair which have been emitted simultaneously. Consequently, any harmonics that might have existed in the echo will be removed from the filter. The filters are designed to match the contents of individual chirps, one for the up-chirp and one for down-chirp. Each filter's transfer function is the time-reversed replica of the transmitted (up or down) chirp.

However, it is important to recall how differently a bubble responds to an up-chirp, compared to a down-chirp, as shown in FIG. 1. FIGS. 2a-c show the match filtered response of a cloud of bubbles, and a target arranged behind the cloud of bubbles, to an up-chirp superimposed with a down-chirp.

FIG. 2a shows the match-filtered response of a bubble cloud and linearly-scattering target when insonified by an up-chirp. FIG. 2b shows the match-filtered response of a bubble cloud and linearly-scattering target when insonified by a down-chirp. FIG. 2c shows the responses of FIGS. 2a and 2b together to highlight the incoherence in the bubble cloud response (illustrated by the darker portions in connection with the bubble scatter compared to the target scatter, which is substantially identical in the case of the up and down chirp).

The bubble cloud responses are different in FIGS. 2a and 2b, after separating the echo into the scattered energy from the up-chirp and down-chirp only. In contrast, the target responses are almost the same. A sum of the two responses would result in the level at the target location being enhanced more than the level within the bubble cloud region owing to the incoherence between responses of the latter.

FIGS. 3a-c show plots from an echolocation trial using a down-chirp and an up-chirp transmitted simultaneously. FIG. 3a shows standard SONAR processing; FIG. 3b shows the prior art TWIPS processing—using the ratio: P−/P+ (i.e the ratio of the difference between the two pulses and the sum of the two pulses); and FIG. 3c shows the an embodiment of the present invention: P−/P2+ (i.e. the ratio of the difference between the two pulses and a processed form of P+, filtered using a filter with a centre frequency that is double the centre frequency of the driving signal).

In each case, in this trial, a small cloud of bubbles was released from the bottom of a water tank approximately 2 m from the sound source and receiver.

Over time, the bubbles travelled upwards towards the water surface. However, the target remained stationary at approximately 3 m from the sound source. The approximate location of the bubbles and the target are shown in FIGS. 3a-c.

Linear enhancement and bubble scatter suppression is seen when emitting the time-reversed pulses simultaneously, however, it is P−/P2+ (i.e. FIG. 3c) that provides the best results.

Figure 4:
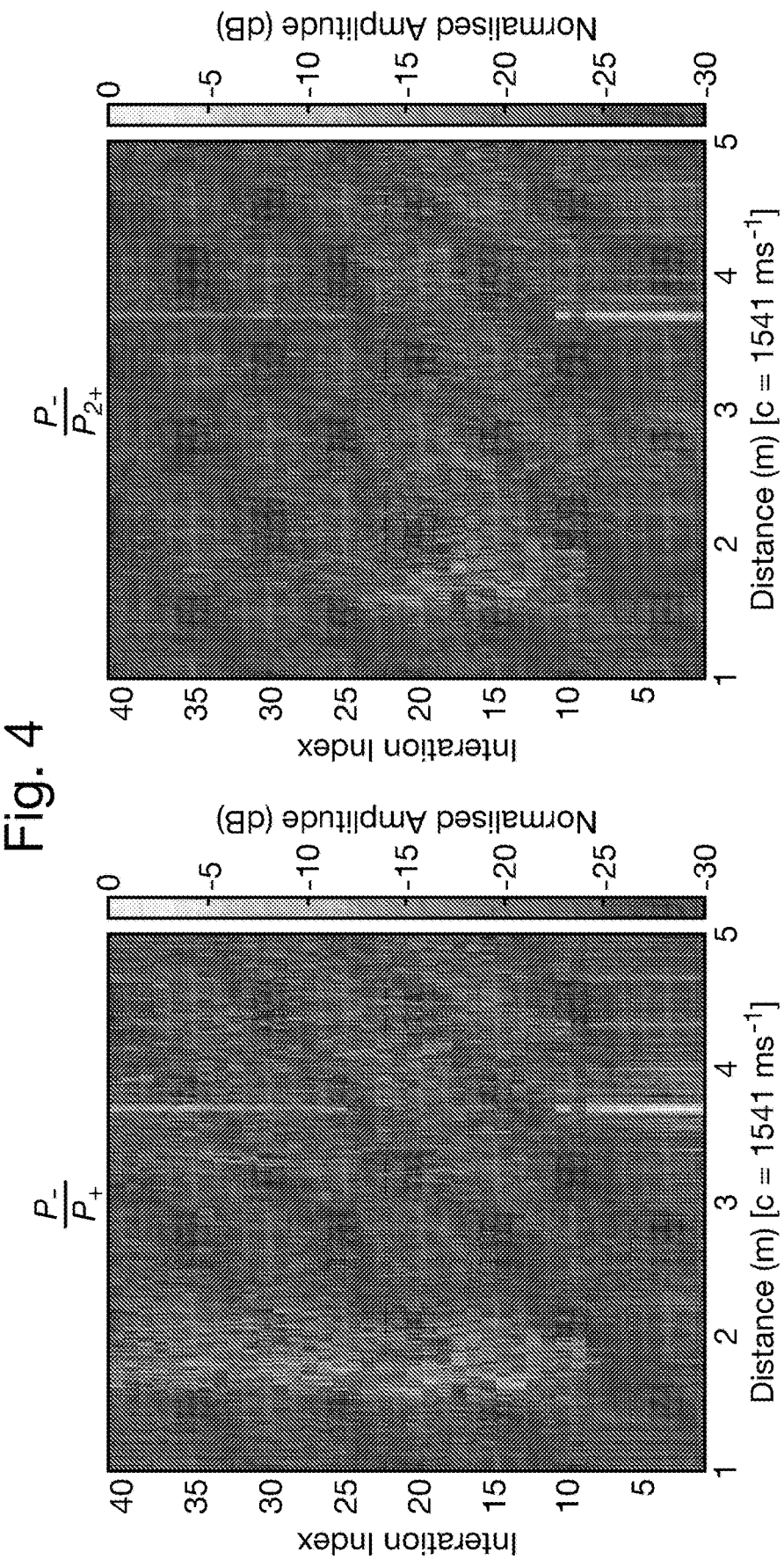
FIG. 4 shows a more detailed view of the results shown in FIGS. 3b and 3c.

This is illustrated more clearly still in FIG. 4 which compares the two ratios of FIGS. 3b and 3c, with a focus on amplitudes between −30 dB and 0 dB (as shown on the right hand axis). Although there is still some scatter from the bubbles, the P−/P2+ plot (on the right hand side) shows much less noise elsewhere while maintaining the enhanced presence of the real target, shown by the clear white vertical line.

Embodiments of the invention may be implemented using known hardware modules, with adapted processing modules to form and synchronise the transmit pulses and receive pulses and process the received echoes. FIG. 5 shows a hardware implementation suitable for use with embodiments of the invention. The system of FIG. 5 comprises a processor 100 which performs the digital processing necessary to prepare and code waveforms for transmission. This is connected to an analog processing section 200 which includes a transmitter and a receiver, each connected to a SONAR transmitter 300 and a SONAR receiver 400 respectively. The processor 100 is programmed to create the transmit pulses and process the received echoes, as set out previously in connection with embodiments of the invention.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A SONAR system comprising:
    a SONAR transmitter configured to transmit a pair of pulses including an up-chirp signal and a down-chirp signal wherein the down-chirp signal is a time-reversed version of the up-chirp signal, and wherein the up-chirp signal and the down-chirp signal at least partially overlap in time;
    a SONAR receiver configured to receive echoes of the pair of pulses as echo pulses; and
    a processor configured to determine a ratio of a difference between the echo pulses and a sum of the echo pulses, wherein the sum of the echo pulses is filtered using a filter having a center frequency that is double a center frequency of the transmitted pair of pulses.

2. The SONAR system of claim 1, wherein the up-chirp signal and down chirp signal are transmitted simultaneously.

3. The SONAR system of claim 1, wherein the frequency of the up-chirp and down-chirp signals changes in a linear fashion over a fixed time period.

4. The SONAR system of claim 1, wherein the frequency of the up-chirp and down-chirp signals changes in a logarithmic fashion over a fixed time period.

5. The SONAR system of claim 1, wherein the receiver comprises a pair of matched filters, each filter of the pair having a transfer function which is a time-reversed replica of a respective one of the transmitted up-chirp or down-chirp signals.

6. The SONAR system of claim 1, wherein the processor is further configured to create the pair of pulses including the up-chirp signal and the down-chirp signal.

7. A method of operating a SONAR system, the method comprising:
    transmitting an up-chirp signal and a down-chirp signal wherein the down-chirp signal is a time-reversed version of the up-chirp signal, and wherein the up-chirp signal and the down-chirp signal at least partially overlap in time;
    receiving echoes of the up-chirp signal and the down-chirp signal as echo pulses; and
    determining, using a processing device, a ratio of a difference between the echo pulses and a sum of the echo pulses, wherein the sum of the echo pulses is filtered using a filter having a center frequency that is double a center frequency of the transmitted up-chirp signal and down-chirp signal.

8. The method of claim 7, wherein the up-chirp signal and down chirp signal are transmitted simultaneously.

9. The method of claim 7, wherein the frequency of the up-chirp and down-chirp signals changes in a linear fashion over a fixed time period.

10. The method of claim 7, wherein the frequency of the up-chirp and down-chirp signals changes in a logarithmic fashion over a fixed time period.

11. A SONAR system configured to carry out the method of claim 7.

12. The method of claim 7, further comprising creating the up-chirp signal and the down-chirp signal using the processing device.

13. At least one non-transitory machine-readable medium encoded with instructions that when executed by one or more processors cause a SONAR system to operate, the operation including:
- transmitting, by the SONAR system, a first pulse including an up-chirp signal;
- transmitting, by the SONAR system, a second pulse including a down-chirp signal, wherein the down-chirp signal is a time-reversed version of the up-chirp signal, and wherein the up-chirp signal and the down-chirp signal at least partially overlap in time;
- receiving, by the SONAR system, echoes of the up-chirp signal and the down-chirp signal as echo pulses; and
- determining, by the one or more processors, a ratio of a difference between the echo pulses and a sum of the echo pulses, wherein the sum of the echo pulses is filtered using a filter having a center frequency that is double a center frequency of the transmitted up-chirp signal and down-chirp signal.

14. The at least one non-transitory machine-readable medium of claim 13, wherein the up-chirp signal and down chirp signal are transmitted simultaneously.

15. The at least one non-transitory machine-readable medium of claim 13, wherein the frequency of the up-chirp and down-chirp signals changes in a linear fashion over a fixed time period.

16. The at least one non-transitory machine-readable medium of claim 13, wherein the frequency of the up-chirp and down-chirp signals changes in a logarithmic fashion over a fixed time period.

17. The at least one non-transitory machine-readable medium of claim 13, wherein the receiving comprises:
- receiving, via a first filter of the SONAR system, a first echo corresponding to the first pulse, wherein the first filter has a transfer function which is a time-reversed replica of the transmitted up-chirp signal; and
- receiving, via a second filter of the SONAR system, a second echo corresponding to the second pulse, wherein the second filter has a transfer function which is a time-reversed replica of the transmitted down-chirp signal.

18. A SONAR system comprising the at least one non-transitory machine-readable medium of claim 13.

19. A vessel comprising the SONAR system of claim 18.

20. The at least one non-transitory machine-readable medium of claim 13, further comprising creating, via the one or more processors, the first pulse including the up-chirp signal and the second pulse including the down-chirp signal.

* * * * *